UNITED STATES PATENT OFFICE.

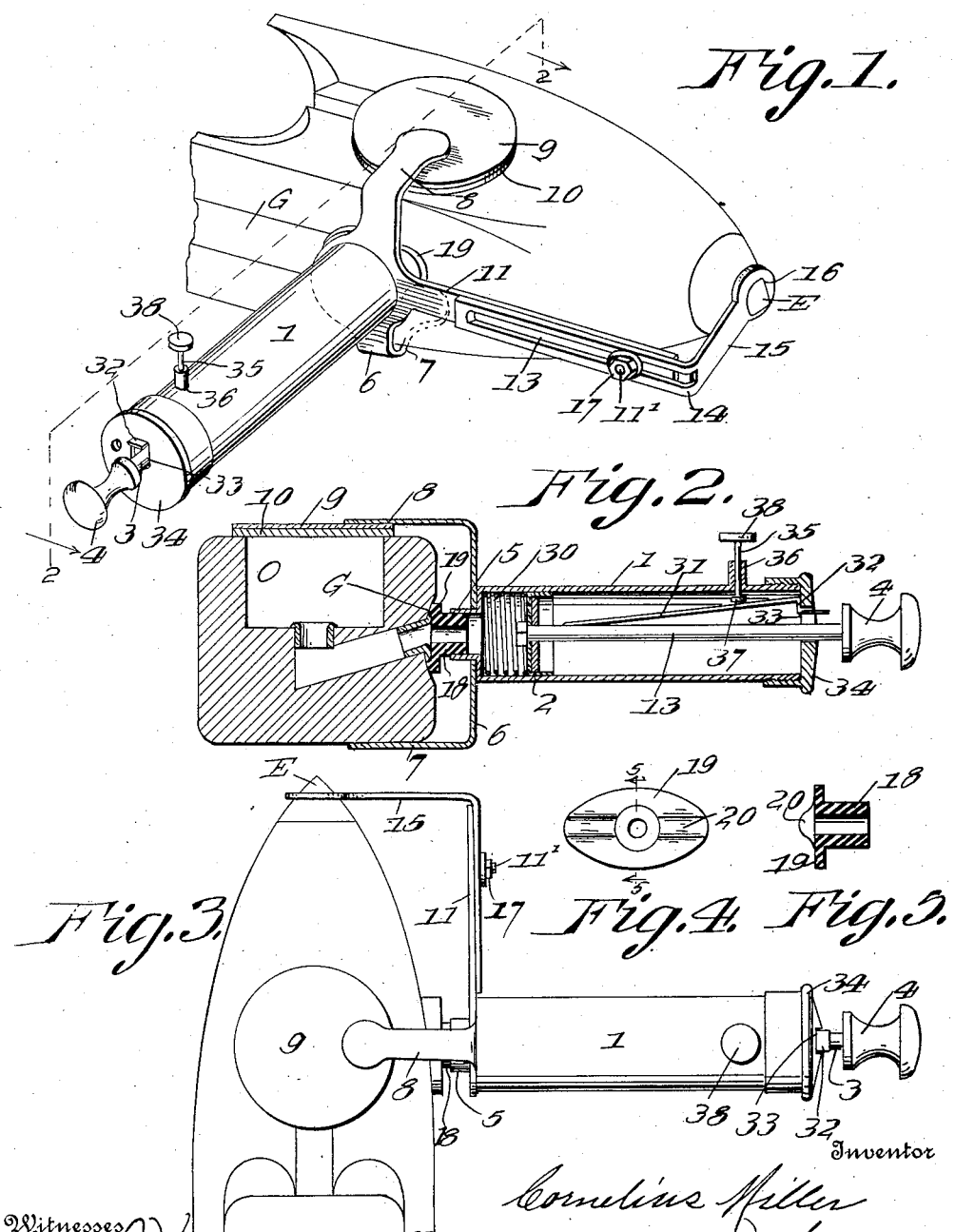

CORNELIUS MILLER, OF PROVIDENCE, RHODE ISLAND, ASSIGNOR TO MICHAEL LENAHAN, OF PROVIDENCE, RHODE ISLAND.

DEVICE FOR THREADING SHUTTLES.

1,063,133.          Specification of Letters Patent.          Patented May 27, 1913.

Application filed October 17, 1912. Serial No. 726,283.

*To all whom it may concern:*

Be it known that I, CORNELIUS MILLER, a citizen of the United States, residing at Providence, in the county of Providence and State of Rhode Island, have invented a new and useful Improvement in Devices for Threading Shuttles, of which the following is a specification.

This invention relates to certain new and useful improvements in devices for threading shuttles, and is an improvement on Letters Patent No. 1,038,777, granted to me September 17, 1912.

The primary object of the present invention is to provide means whereby the piston is locked in position ready for use, and has means for automatically operating the same on its exhausting stroke, upon release of the locking means, whereby the operator prior to placing the device on the shuttle moves the piston inwardly, causing the same to automatically engage the locking means, and then applies the device to the shuttle, and upon release of the locking means allows the piston operating means to automatically move the piston outwardly on its exhausting stroke.

In the drawings: Figure 1 is a perspective view of the present invention showing same applied to a shuttle in position for threading thereof. Fig. 2 is a sectional view on the line 2—2 of Fig. 1. Fig. 3 is a top plan view. Fig. 4 is a front elevation of the rubber mouth of the air exhausting means, and Fig. 5 is a section on the line 5—5 of Fig. 4.

The present invention is illustrated as applied to the cylinder and shuttle attaching means therefor which is shown in my aforementioned patent, but it will be understood that the present invention is capable of application to cylinders having other attaching means.

The cylinder 1 slidably receives a piston head 2 mounted on a rod 13, the latter having a finger gripping head 4. The cylinder is then contracted at 5 and is passed through an opening in a U-shaped arm 6 and is rigidly secured to said arm. The bottom member 7 of arm 6 engages the shuttle bottom and the top member 8 overlies the shuttle top and has a disk 9 secured thereto, the latter carrying the rubber washer 10 to form an air tight connection with the shuttle top. A horizontal member 11 projects outwardly from arm 6 and has a bolt 11′ secured to its free end, the bolt passing through a slot 13 of an arm 14. Arm 14 has its outer end turned at right angles at 15 and formed with an opening 16 to receive the shuttle tip E. A nut 17 engages over the bolt and holds arm 14 in any position to which it may be capable of being adjusted to accommodate shuttles of varying types. The end 5 of cylinder 1 has a rubber mouth secured thereto, the mouth having a tubular shank 18 which frictionally engages on the interior of said end 5. The outer end of the mouth has a head 19 formed with ribs 20 which conformably engage in the usual side groove G formed in the shuttle body. All of the above mentioned parts are disclosed in my said patent, and I will now describe the present invention which is applied to the cylinder 1.

A coil spring 30 is arranged on the interior of cylinder 1 and is disposed between the inner end of the cylinder and the piston head 2 as shown in Fig. 2 of the drawings in which the spring is shown in compressed position. The piston rod 3 has a spring arm 31 rigidly secured thereto, the free end portion of the arm being inclined outwardly away from rod 3 and is formed at its free extremity with a shouldered catch 32. The catch 32 operates in a slot 33 formed in the cylinder head 34, and as depicted in Fig. 2 of the drawings, when the piston head is in its innermost position, it is held in such position by the shoulder of catch 32 engaging the rear face of cylinder head 34. In order to release the piston to cause same to be moved outwardly by the coiled spring 30, a gravity slidable plunger 35 is employed, the plunger having its stem sliding in a perforated boss formed on the cylinder 1, and having its inner end formed with an enlarged foot 37 and its outer end formed with a finger engaging head 38. The foot 37 acts to both engage spring arm 31 and move same so that the shoulder of catch 32 is disengaged from cylinder head 34, and to prevent disengagement of the plunger from the cylinder.

In operation a bunch of thread is gathered in the opening O of the shuttle, and the piston then moved inwardly, in which movement the inclined arm 31 is engaged with the outer end wall formed by the slot 33 of cylinder head 34, and depressed until the shoulder of catch 32 completely passes through the slot, at which time the arm 31, by reason of its spring properties moves outwardly to the position shown in Fig. 2, when the piston will be held in locked position. The device is then positioned on the shuttle as shown in the drawings, and the operator presses inwardly on the plunger head 38, with the result that the foot 37 by reason of engaging the arm 31, moves the latter and its catch 32 toward the rod 3, whereupon the spring 30 expands and moves the piston head 2 outwardly on its exhausting stroke.

From the above it will be evident that the threading of the shuttle is accomplished automatically without any labor on the part of the operator other than to depress the plunger 35.

Having thus described my invention, I claim as new and desire to secure by Letters Patent;—

In a device of the type set forth, in combination with a cylinder and means for attaching the same to a shuttle, a piston rod having a head on the interior of the cylinder, a coil spring between the piston and the inner end of the cylinder, a spring arm having one end attached to the rod and having its free end portion inclined outwardly with relation to the rod and having a shouldered catch on the free end of said arm, a head for the cylinder formed with a slot which receives the arm and catch, a perforated boss on the cylinder, and a slidable plunger in the boss, said plunger having a foot on its inner end which engages the arm and a head on its outer end for engagement with the fingers of the operator.

In testimony whereof I have signed my name to this specification in the presence of two subscribing witnesses.

CORNELIUS MILLER.

Witnesses:
ADA E. HAGERTY,
J. A. MILLER.

---

Copies of this patent may be obtained for five cents each, by addressing the "Commissioner of Patents, Washington, D. C."